United States Patent
Ni et al.

(10) Patent No.: US 11,740,486 B2
(45) Date of Patent: Aug. 29, 2023

(54) LENS DRIVING DEVICE

(71) Applicant: Changzhou AAC Raytech Optronics Co., Ltd., Changzhou (CN)

(72) Inventors: Tianheng Ni, Shenzhen (CN); Feng Yan, Shenzhen (CN); Suohe Wei, Shenzhen (CN)

(73) Assignee: Changzhou AAC Raytech Optronics Co., Ltd., Changzhou (CN)

( * ) Notice: Subject to any disclaimer, the term of this patent is extended or adjusted under 35 U.S.C. 154(b) by 146 days.

(21) Appl. No.: 17/529,266

(22) Filed: Nov. 18, 2021

(65) Prior Publication Data

US 2022/0179229 A1 Jun. 9, 2022

(30) Foreign Application Priority Data

Dec. 8, 2020 (CN) .......................... 202011423804.4

(51) Int. Cl.
| | |
|---|---|
| *G02B 27/64* | (2006.01) |
| *G03B 5/06* | (2021.01) |
| *G03B 30/00* | (2021.01) |
| *G03B 5/00* | (2021.01) |

(52) U.S. Cl.
CPC ............. *G02B 27/646* (2013.01); *G03B 5/00* (2013.01); *G03B 5/06* (2013.01); *G03B 30/00* (2021.01); *G03B 2205/0007* (2013.01); *G03B 2205/0023* (2013.01); *G03B 2205/0076* (2013.01)

(58) Field of Classification Search
CPC .... G03B 2205/0076; G03B 2205/0007; G03B 2205/0023; G03B 5/00; G03B 5/06; G03B 30/00; G02B 27/646; G02B 7/023; H04N 23/682
See application file for complete search history.

(56) References Cited

U.S. PATENT DOCUMENTS

| | | | |
|---|---|---|---|
| 11,570,334 B2* | 1/2023 | Ni ............................ | G03B 3/10 |
| 2013/0162896 A1* | 6/2013 | Kang ....................... | G03B 5/00 |
| | | | 348/E5.026 |
| 2014/0028906 A1* | 1/2014 | Chen ........................ | G03B 5/00 |
| | | | 348/375 |
| 2022/0206362 A1* | 6/2022 | Ni ........................... | H04N 23/51 |
| 2022/0206363 A1* | 6/2022 | Yan ......................... | H05K 1/189 |

* cited by examiner

*Primary Examiner* — Derek S. Chapel
(74) *Attorney, Agent, or Firm* — W&G Law Group

(57) ABSTRACT

A lens driving device includes fixing bracket, first support frame sleeved on the fixing bracket, second support frame sleeved on the first support frame, rotation assembly configured to make the fixing bracket rotate relative to the first support frame about a first direction and the first support frame rotate relative to the second support frame about a second direction, driving assembly for driving fixing bracket to rotate relative to first support frame about the first direction and driving the first support frame to rotate relative to the second support frame about the second direction, flexible printed circuit board, first elastic support components, and second elastic support components. The lens driving device increases spacing between adjacent two of crossing portions of the shape memory wires so that the shape memory wires have enough space for the movement, preventing the shape memory wires from being interfered with each other during the movement.

9 Claims, 7 Drawing Sheets

LENS DRIVING DEVICE

TECHNICAL FIELD

The present disclosure relates to a driving device, and in particular, to a lens driving device.

BACKGROUND

With the development of photographing technology, lens driving devices have been widely used in various photographing apparatus. Consumers are fond of devices combining lens driving devices with various portable electronic devices such as mobile phones, cameras, computers, etc.

The shape memory alloy (SMA) driving structure of the lens in the related art fixes one end of each of shape memory wires electrically connected to a printed circuit board to an outer frame, and then fixes the other end of the shape memory wire to an inner frame where the lens module is installed. In this way, the shape memory wires are energized by the printed circuit board so that the shape memory wires contract to generate a pulling force to pull the inner frame to move, thereby realizing the image stabilization function of the lens. The shape memory wires of this SMA driving structure are fixed on the outer frame and the inner frame so that the shape memory wires can interfere with each other due to a small crossing spaces during the movement, thereby adversely affecting the image stabilization function.

Therefore, it is necessary to provide a lens driving device to solve the above problems.

SUMMARY

The technical problem to be solved by the present disclosure is to provide a lens driving device, which prevents the shape memory wires in the SMA driving structure from being interfered with each other during the movement.

To solve the above technical problems, the present disclosure provides a lens driving device, and the lens driving device includes:

a fixing bracket having a rectangular structure with a receiving space surrounded by sidewalls, the receiving space being configured to install a lens module;

a first support frame having a rectangular structure surrounded by first sidewalls, the first support frame being sleeved on the fixing bracket and spaced apart from the fixing bracket;

a second support frame having a rectangular structure surrounded by second sidewalls, the second support frame being sleeved on the first support frame and spaced apart from the first support frame;

a rotation assembly, where the fixing bracket is rotatably connected to the first support frame through the rotation assembly in such a manner that the fixing bracket is rotatable relative to the first support frame about a first direction; the first support frame and the second support frame are rotatably connected to each other through the rotation assembly in such a manner that the first support frame is rotatable relative to the second support frame about a second direction; and the first direction and the second direction are both perpendicular to an optical axis and are respectively parallel to two diagonal directions of the fixing bracket;

a driving assembly including at least two shape memory wires, wherein each of the at least two shape memory wires has a fixed end and a driving end; the fixed ends of the at least two shape memory wires are connected to the second support frame and are spaced apart from each other; and the driving end of one of the at least two shape memory wires is connected to the fixing bracket at an angle with respect to a horizontal plane to drive the fixing bracket to rotate relative to the first support frame about the first direction, and the driving end of another one of the at least two shape memory wires is connected to the first support frame at an angle with respect to the horizontal plane to drive the first support frame to rotate relative to the second support frame about the second direction;

a flexible printed circuit board connected to the at least two shape memory wires and configured to control the at least two shape memory wires;

at least one first elastic support component configured to elastically connect the fixing bracket with the first support frame and providing a rotation restoring force for a rotation of the fixing bracket relative to the first support frame about the first direction; and at least one second elastic support component configured to elastically connect the first support frame with the second support frame and providing a rotation restoring force for a rotation of the first support frame relative to the second support frame about the second direction.

As an improvement, the fixed ends of each of the at least two shape memory wires is connected to the second support frame through a first wire hook portion.

As an improvement, the driving end of one of the at least two shape memory wires that is connected to the fixing bracket is connected to the fixing bracket through a second wire hook portion.

As an improvement, the driving end of one of the at least two shape memory wires that is connected to the first support frame is connected to the first support frame through a third wire hook portion.

As an improvement, the at least one first elastic support component comprises two first elastic support components that are respectively disposed at positions of one pair of diagonals of the first support frame along the first direction and are spaced apart from each other, and each of the two first elastic support components has a planar elastic sheet structure perpendicular to the optical axis.

As an improvement, each of the two first elastic support components comprises a first fixed arm fixed at one corner of the fixing bracket, two second fixed arms respectively fixed on two adjacent ones of the first sidewalls of the first support frame, and two first elastic arms that are suspended and configured to connect the two second fixed arms with the first fixed arm.

As an improvement, the at least one second elastic support component comprises two second elastic support components that are disposed at positions of another pair of diagonals of the first support frame along the second direction and are spaced apart from each other, and each of the two second elastic support components has a planar elastic sheet structure perpendicular to the optical axis.

As an improvement, each of the two second elastic support components comprises a third fixed arm fixed at one corner of the first support frame, two fourth fixed arms respectively fixed on two adjacent ones of the second sidewalls of the second support frame, and two second elastic arms that are suspended and configured to connect the two fourth fixed arms with the third fixed arm.

As an improvement, the lens driving device further includes a shell covering the second support frame.

Compared with the related art, in the lens driving device of the present disclosure, a three-layer support structure is provided. The fixed ends of the shape memory wires are all connected to the external second support frame, and then the driving ends are respectively connected to the internal fixing bracket and the first support frame. The spacing between adjacent two of the crossing portions of the shape memory wires is increased so that the shape memory wires have enough space for movement, thereby avoiding the shape memory wires from being interfered with each other during the movement and preventing the image stabilization function of the lens driving device from being affected.

BRIEF DESCRIPTION OF DRAWINGS

In order to more clearly describe the technical solutions in the embodiments of the present disclosure, the following will briefly describe the drawings used in the description of the embodiments. It is apparent that the drawings in the following description merely illustrate some embodiments of the present disclosure. Those skilled in the art may obtain other drawings based on these drawings. In the drawings.

Figure 1:
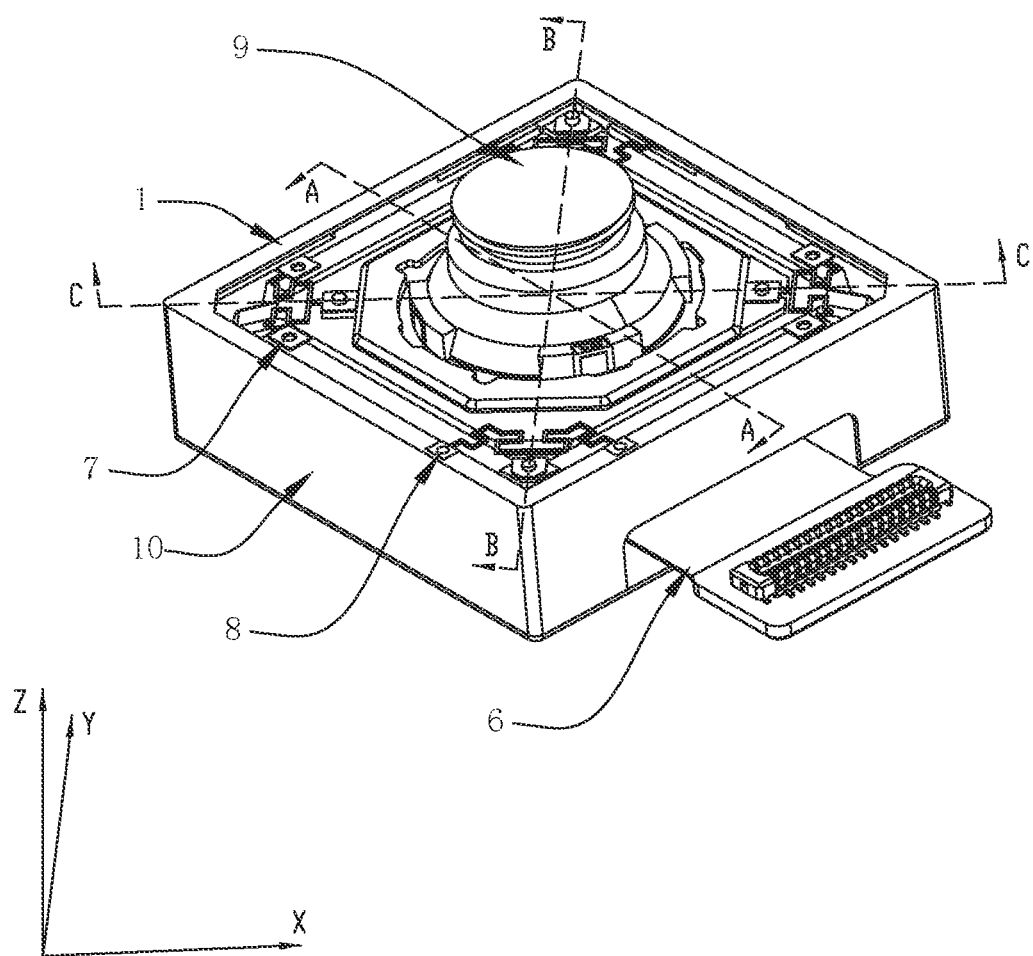
FIG. 1 is a schematic respective view showing a structure of a lens driving device according to an embodiment of the present disclosure.

DESCRIPTION OF REFERENCE NUMERALS 1. fixing bracket; 11. sidewall; 12. support wall; 13. first sliding groove;

2. first support frame; 21. first sidewall; 22. first avoidance groove; 23. second sliding groove; 24. first support wall; 25. third sliding groove;

3. second support frame; 31. second sidewall; 32. second avoidance groove; 33. fourth sliding groove;

4. rotation assembly; 41. first rolling ball; 42. second rolling ball;

5. driving assembly; 51. shape memory wire; 52. first wire hook portion; 53. second wire hook portion; 54. third wire hook portion;

6. flexible printed circuit board;

7. first elastic support component; 71. first fixed arm; 72. second fixed arm; first elastic arm;

8. second elastic support component; 81. third fixed arm; 82. fourth fixed arm; 83. second elastic arm;

9. lens module;

10. shell.

DESCRIPTION OF EMBODIMENTS

The technical solutions in the embodiments of the present disclosure will be clearly and completely described below in conjunction with the accompanying drawings in the embodiments of the present disclosure. It is apparent that the described embodiments are merely some of, rather than all of embodiments of the present disclosure. Based on the embodiments of the present disclosure, all other embodiments obtained by those skilled in the art without involving inventive steps shall fall within the scope of the present disclosure.

Figure 2:
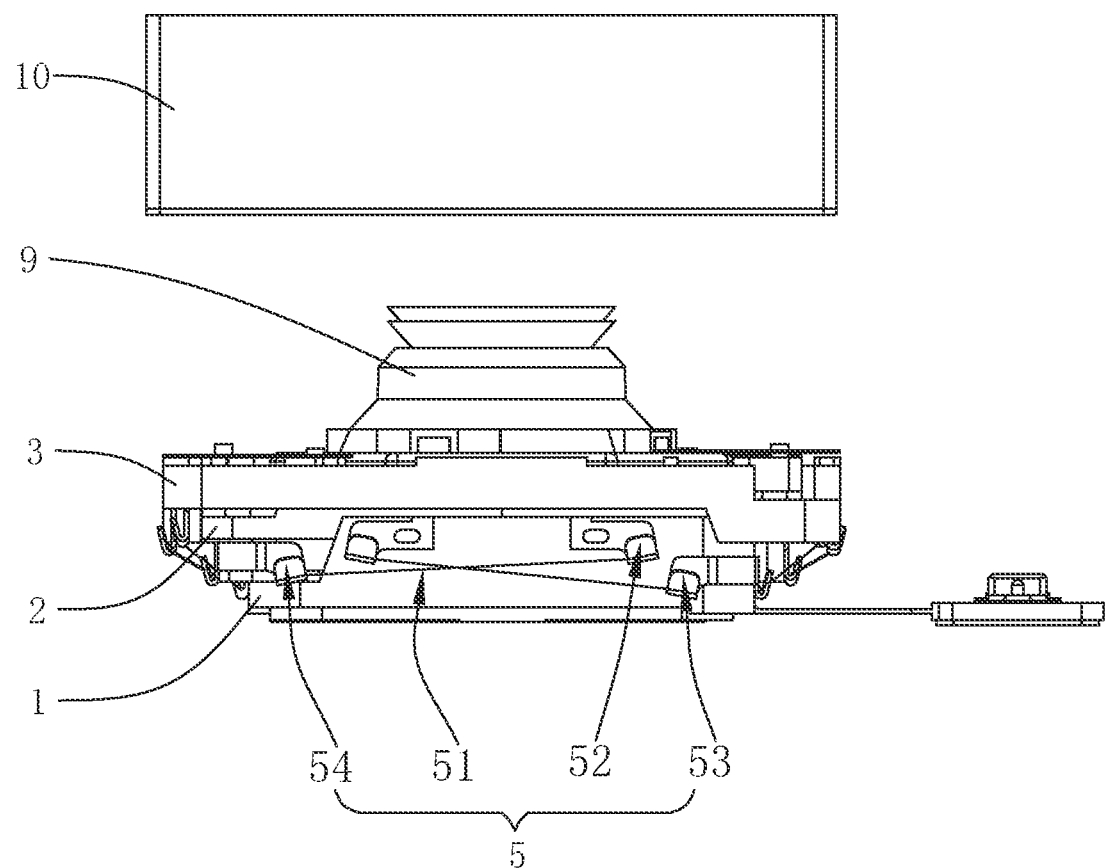
FIG. 2 is a schematic exploded view showing a partial structure of a lens driving device according to an embodiment of the present disclosure.
Figure 3:
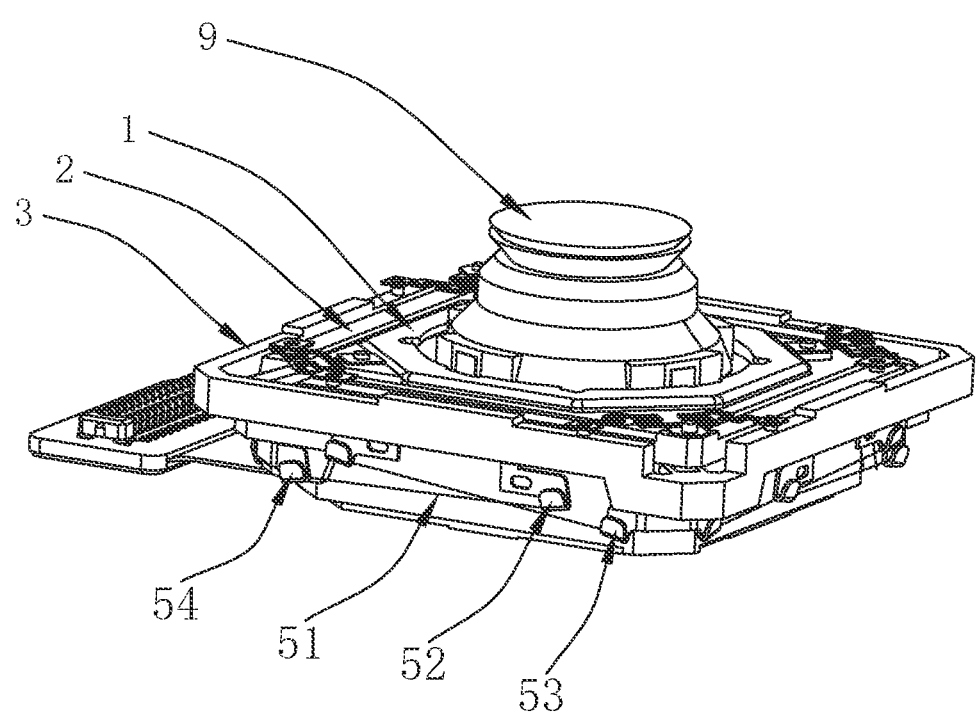
FIG. 3 is a schematic diagram showing a partial structure of a lens driving device according to an embodiment of the present disclosure, of which a shell is removed.
Figure 4:
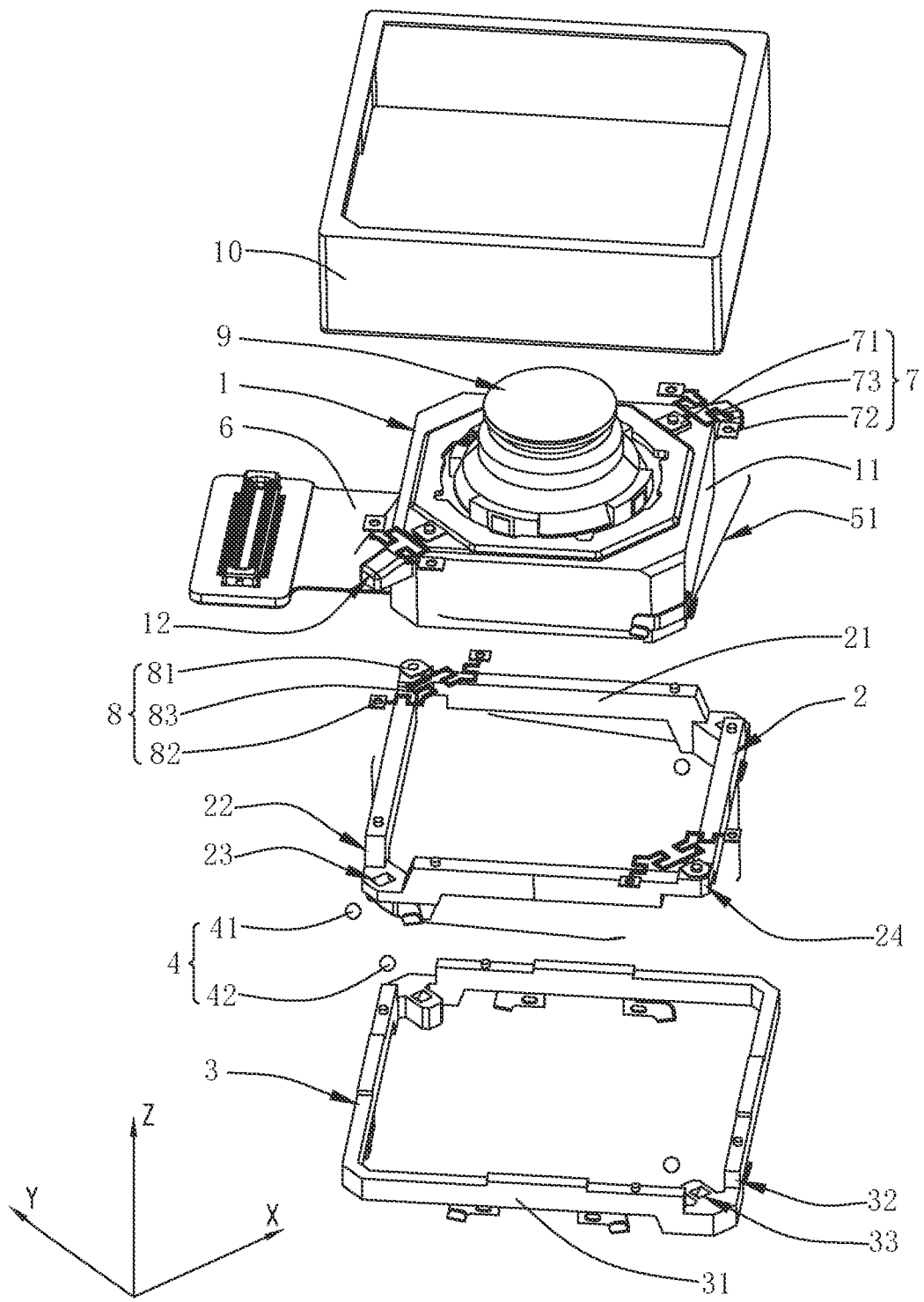
FIG. 4 is another schematic exploded view of a partial structure of a lens driving device according to an embodiment of the present disclosure.
Figure 5:
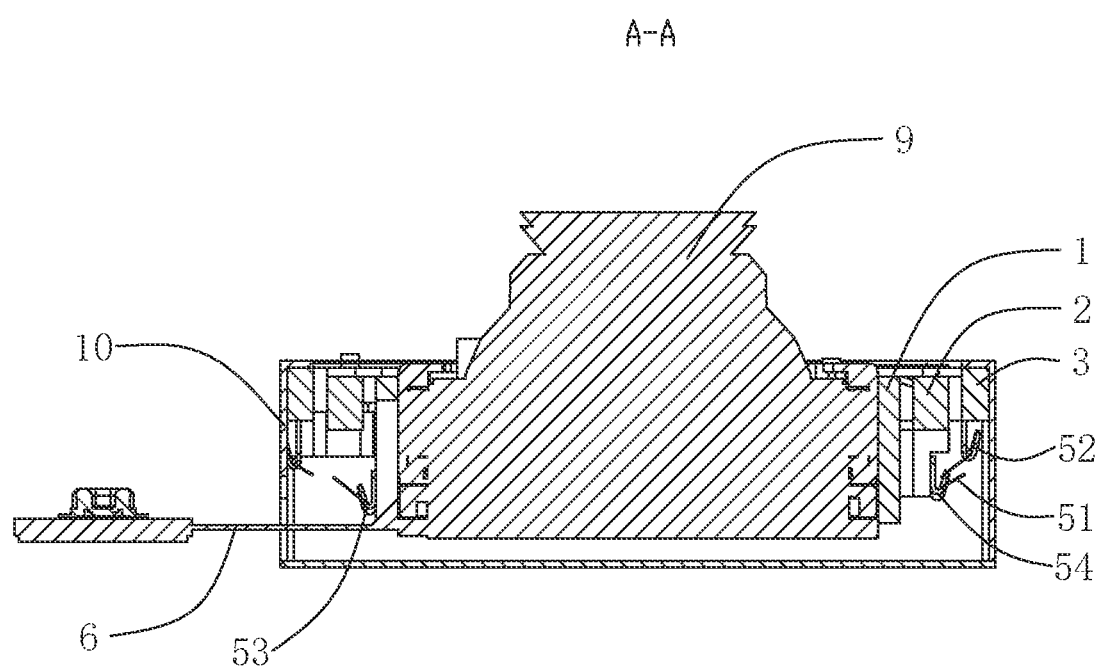
FIG. 5 is a cross-sectional view along line A-A shown in FIG. 1.
Figure 6:
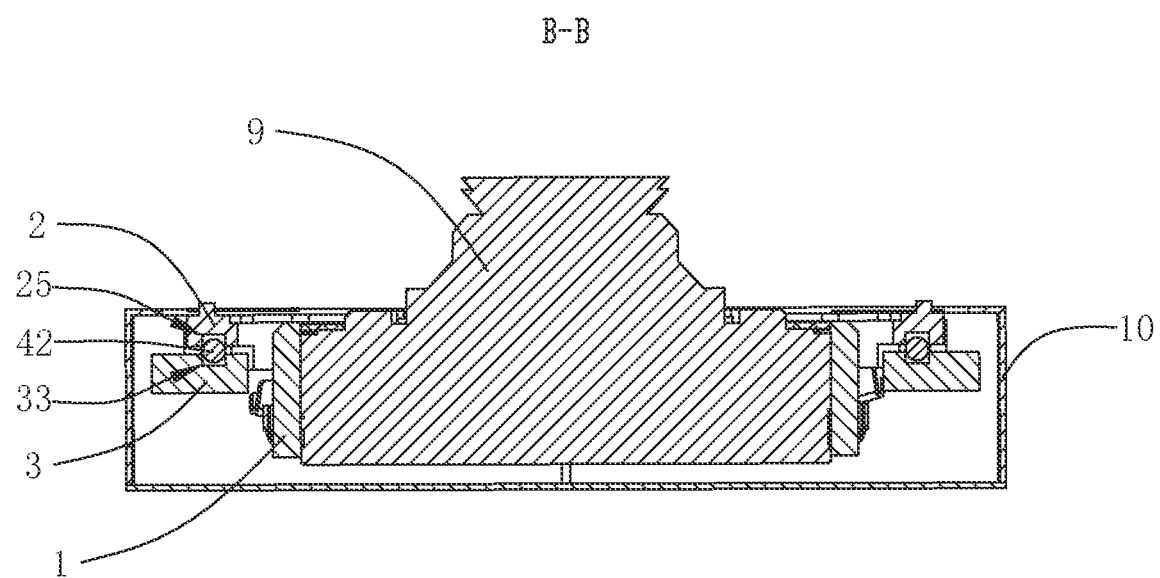
FIG. 6 is a cross-sectional view along line B-B shown in FIG. 1.
Figure 7:
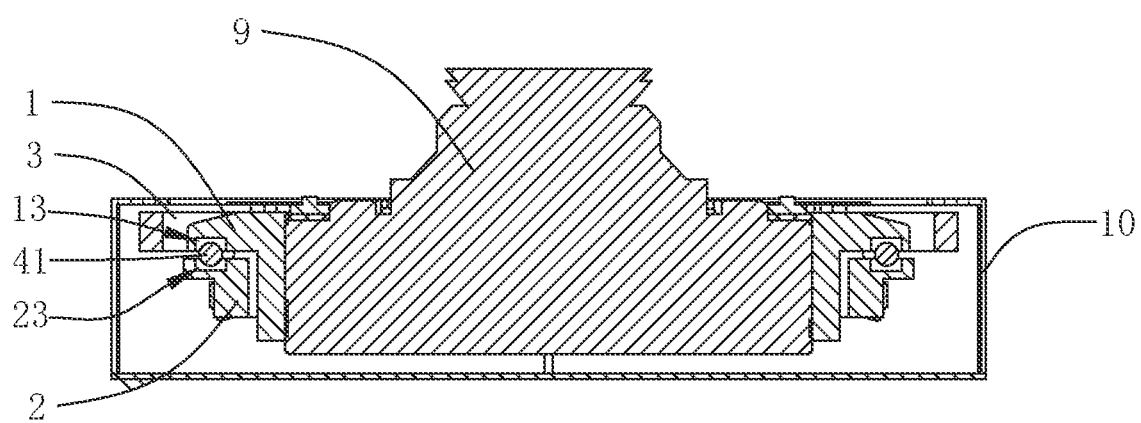
FIG. 7 is a cross-sectional view along line C-C shown in FIG. 1.

An embodiment of the present disclosure provides a lens driving device. As shown in FIG. 1 to FIG. 7, the lens driving device includes a fixing bracket 1, a first support frame 2, a second support frame 3, a rotation assembly 4, a driving assembly 5, a flexible printed circuit board 6, a first elastic support component 7, and a second elastic support component 8.

The fixing bracket 1 has a rectangular structure with a receiving space surrounded by sidewalls 11. The receiving space is configured to install a lens module 9.

In an embodiment, the fixing bracket 1 further includes first sliding groove 13 formed by recessing the sidewalls 11 at positions of one pair of diagonals.

The first support frame 2 has a rectangular structure surrounded by first sidewalls 21, and the first support frame 2 is sleeved on the fixing bracket 1 and spaced apart from the fixing bracket 1.

In an embodiment, the first support frame 2 further includes second sliding grooves 23 formed by recessing top surfaces of the first sidewalls 21 at positions of the one pair of diagonals, and third sliding grooves 25 formed by recessing bottom surfaces of the first sidewalls 21 at positions of another pair of diagonals.

The second support frame 3 has second a rectangular structure surround by sidewalls 31, and the second support frame 3 is sleeved on the first support frame 2 and spaced apart from the first support frame 2.

In an embodiment, the second support frame 3 further includes fourth sliding grooves 33 formed by recessing top surfaces of the second sidewalls 31 at positions of the another pair of diagonals.

In an embodiment, the rotation assembly 4 includes two first rolling balls 41 and two second rolling balls 42. Each first rolling ball 41 is clamped in the first sliding groove 13 and the second sliding groove 23 that are opposite to each other. In this way, the fixing bracket 1 and the first support frame 2 are spaced apart from each other and rotatably connected to each other around the first direction. Each second rolling ball 42 is clamped in the third sliding groove 25 and the fourth sliding groove 33 that are opposite to each other. In this way, the first support frame 2 and the second support frame 3 are spaced apart from each other and rotatably connected around the second direction.

In an embodiment, the first direction and the second direction are perpendicular to the optical axis of the lens module 9, and are parallel two diagonal lines of the fixing bracket 1, respectively.

In the embodiment, the first direction is defined as an X direction, the second direction is defined as a Y direction, and the optical axis of the lens module 9 is defined as a Z direction. The first direction and the second direction are perpendicular to each other.

In an embodiment, the fixing bracket 1 further includes support walls 12 that are formed by extending the side walls 11 outwards at positions of the one pair of diagonals in the first direction, and each first sliding groove 13 is disposed at a bottom surface of one support wall 12. The first support frame 2 can further include first avoidance grooves 22 that are formed by recessing the top surfaces of the first side walls 21 at positions of the one pair of diagonals in the first direction, and each sliding groove 23 is disposed at a bottom of one first avoidance groove 22. The support wall 12 extends into the first avoidance groove 22.

The support walls 12 are disposed on the fixing bracket 1 and extend outwards, and the first avoidance grooves 22 are disposed on the first support frame 2. In this way, heights of the first sliding grooves 13 and the second sliding grooves 23 relative to the horizontal plane are reduced while ensuring that the first sliding groove 13 corresponds to the second sliding groove 23, thereby reducing a height of the overall structure of the lens driving device.

In an embodiment, the first support frame 2 further includes first support walls 24 that are formed by respectively extending from the first side walls 21 outwards at positions of the another pair of diagonals in the second direction, and each third sliding groove 25 is disposed at a bottom surface of one first support wall 24. The second support frame 3 can further include second avoidance grooves 32 that are formed by recessing the top surfaces of the second sidewalls 31 at positions of the another pair of diagonals in the second direction, and each fourth sliding groove 33 is disposed in a bottom of one second avoidance groove 32. Each first support wall 24 extends into one second avoidance groove 32.

The first support walls 24 are disposed on the first support frame 2 and extend outwards, and the second avoidance grooves 32 are disposed on the second support frame 3. In this way, heights of the first sliding grooves 13 and the second sliding grooves 23 relative to the horizontal plane are reduced while ensuring that the third sliding groove 25 corresponds to the fourth sliding groove 33, thereby reducing the height of the overall structure of the lens driving device.

In an embodiment, the first sliding grooves 13 and the second sliding grooves 23 are both V-shaped structural grooves, so that groove walls on both sides of the grooves can limit the degree of freedom of the rolling balls in other directions to avoid the position shift of the fixing bracket 1 generated during the rotation.

In an embodiment, the third sliding grooves 25 and the fourth sliding grooves 33 are both V-shaped structural grooves, so that groove walls on both sides of the grooves can limit the degree of freedom of the rolling balls in other directions to avoid the position shift of the first support frame 2 generated during the rotation.

It should be understood that the fixing bracket 1 and the first support frame 2 can be connected by a rotation shaft to achieve the rotatable connection between the fixing bracket 1 and the first support frame 2 based on actual requirements. Accordingly, the first support frame 2 and the second support frame 3 are also connected by a rotation shaft to achieve the rotatable connection between the first support frame 2 and the second support frame 3.

In an embodiment, the driving assembly 5 is configured to drive the fixing bracket 1 to rotate relative to the first support frame 2 about the first direction and to drive the first support frame 2 to rotate relative to the second support frame 3 about the second direction. The fixing bracket 1 rotates relative to the first support frame 2 about the first direction, which drives the lens module 9 to rotate about the first direction. The first support frame 2 rotates relative to the second support frame 3 about the second direction, which drives the lens module 9 to rotate about the second direction.

In an embodiment, the driving assembly 5 includes at least two shape memory wires 51, each of which has a fixed end and a driving end. The fixed ends of the at least two shape memory wires 51 are connected to the second sidewalls 31 of the second support frame 3 and are spaced apart from each other. The driving end of one of the at least two shape memory wires 51 is connected to the sidewall 11 of the fixing bracket 1 at an angle with respect to the horizontal plane to drive the fixing bracket 1 to rotate relative to the first support frame 2 about the first direction. The driving end of another one of the at least two shape memory wires 51 is connected to the first sidewall 21 of the first support frame 2 at an angle with respect to the horizontal plane to drive the first support frame 2 to rotate relative to the second support frame 3 about the second direction.

When the shape memory wires 51 are energized, the shape memory wires 51 contract to generate a pulling force, so that the fixing bracket 1 is pulled to rotate relative to the first support frame 2 about the first direction, or the first support frame 2 is pulled to rotate relative to the second support frame 3 about the second direction.

In an embodiment, the angle formed between the horizontal plane and the shape memory wire 51 is not equal to 90°.

In an embodiment, the driving assembly 5 includes eight shape memory wires 51, every two of which form a group. The fixed ends of the two shape memory wires 51 in a same group are connected to a same side of the second support frame 3, and are spaced apart from each other. The driving end of one of the two shape memory wires 51 in a same group is connected to a side corresponding to the fixing bracket 1, and the driving end of the other of the two shape memory wires 51 is connected to a side corresponding to the first support frame 2. The two shape memory wires 51 in the same group cross each other to connect the second support frame 3 with the fixing bracket 1 and to connect the second support frame 3 and the first support frame 2.

In an embodiment, the fixed end of each shape memory wire 51 is connected to the second support frame 3 through a first wire hook portion 52, and the driving end of the shape memory wire 51 connected to the fixing bracket 1 is connected to the fixing bracket 1 through a second wire hook portion 53. The driving end of the shape memory wire 51 connected to the first support frame 2 is connected to the first support frame 2 through a third hooking portion 54. Accordingly, the two ends of the shape memory wire 51 can be easily connected, and the stability after the connection is improved.

In an embodiment, the flexible printed circuit board 6 is connected to the shape memory wires 51 to control the shape memory wires 51.

In some embodiments, the flexible printed circuit board 6 is electrically connected to the shape memory wires 51 to energize and de-energize the shape memory wires 51. In this way, the corresponding shape memory wire 51 is controlled to drive the fixing bracket 1 to rotate relative to the first support frame 2 about the first direction, or the corresponding shape memory wire 51 is controlled to drive the first support frame 2 to rotate relative to the second support frame 3.

In an embodiment, the fixing bracket 1 and the first support frame 2 are elastically connected to each other through the first elastic support components 7, and the first elastic support components 7 is configured to provide a rotation restoring force for the fixing bracket 1 to rotate relative to the first support frame 2 about the first direction.

In an embodiment, the first elastic support components 7 includes two first elastic support components, the two first elastic support components are respectively disposed at positions of the one pair of diagonals of the first support frame 2 and are spaced apart from each other in the first direction. The two first elastic support components 7 each have a planar elastic sheet structure perpendicular to the optical axis.

In an embodiment, each first elastic support component 7 includes a first fixed arm 71 fixed at one corner of the fixing bracket 1, two second fixed arms 72 fixed on two adjacent first sidewalls 21 of the first support frame 2, and two first elastic arms 73 disposed in a suspended manner and configured to connect the two second fixed arms 72 with the first fixed arm 71.

In an embodiment, the first support frame 2 and the second support frame 3 are elastically connected to each other by the second elastic support component 8, and the second elastic support component 8 is configured to provide a rotation restoring force for the first support frame 2 to rotate relative to the second support frame 3 about the second direction.

In an embodiment, the second elastic support components 8 includes two second elastic support components, and the two second elastic support components are disposed at positions of the another pair of diagonals of the first support frame 2 and are spaced apart from each other in the second direction. The second elastic support composes 8 each have a planar elastic sheet structure perpendicular to the optical axis.

In an embodiment, each second elastic support component 8 includes a third fixed arm 81 fixed at one corner of the first support frame 2, two fourth fixed arms 82 fixed on two adjacent second side walls 31 of the second support frame 3, and two second elastic arms 83 disposed in a suspended manner and configured to connect the two fourth fixed arms 82 with the third fixed arm 81.

In an embodiment, the lens driving device further includes a shell 10 covering the second support frame 3 to protect internal components thereof.

Compared with the related art, in the lens driving device of the present disclosure, a three-layer support structure is provided. The fixed ends of the shape memory wires 51 are connected to the external second support frame 3, and then the driving ends of the shape memory wires 51 are connected to the internal fixing bracket 1 and the first support frame 2 in a cross manner. The lens driving device increases the spacing between the crossing portions of the shape memory wires 51 so that the shape memory wires 51 have enough space for movement to avoid the shape memory wires 51 from being interfered with each other during the movement. Accordingly, the image stabilization function of the lens driving device cannot be affected.

The above merely illustrates some embodiments of the present disclosure. It should be noted that those skilled in the art may make improvements without departing from the concept of the present disclosure, which shall be included within the scope of the present disclosure.

What is claimed is:

1. A lens driving device, comprising:
   a fixing bracket having a rectangular structure with a receiving space surrounded by sidewalls, the receiving space being configured to install a lens module;
   a first support frame having a rectangular structure surrounded by first sidewalls, the first support frame being sleeved on the fixing bracket and spaced apart from the fixing bracket;
   a second support frame having a rectangular structure surrounded by second sidewalls, the second support frame being sleeved on the first support frame and spaced apart from the first support frame;
   a rotation assembly, wherein the fixing bracket is rotatably connected to the first support frame through the rotation assembly in such a manner that the fixing bracket is rotatable relative to the first support frame about a first direction; the first support frame and the second support frame are rotatably connected to each other through the rotation assembly in such a manner that the first support frame is rotatable relative to the second support frame about a second direction; and the first direction and the second direction are both perpendicular to an optical axis and are respectively parallel to two diagonal directions of the fixing bracket;
   a driving assembly comprising at least two shape memory wires, wherein each of the at least two shape memory wires has a fixed end and a driving end; the fixed ends of the at least two shape memory wires are connected to the second support frame and are spaced apart from each other; and the driving end of one of the at least two shape memory wires is connected to the fixing bracket at an angle with respect to a horizontal plane to drive the fixing bracket to rotate relative to the first support frame about the first direction, and the driving end of another one of the at least two shape memory wires is connected to the first support frame at an angle with respect to the horizontal plane to drive the first support frame to rotate relative to the second support frame about the second direction;
   a flexible printed circuit board connected to the at least two shape memory wires and configured to control the at least two shape memory wires;
   at least one first elastic support component configured to elastically connect the fixing bracket with the first support frame and providing a rotation restoring force for a rotation of the fixing bracket relative to the first support frame about the first direction; and
   at least one second elastic support component configured to elastically connect the first support frame with the second support frame and providing a rotation restoring force for a rotation of the first support frame relative to the second support frame about the second direction.

2. The lens driving device as described in claim 1, wherein the fixed end of each of the at least two shape memory wires is connected to the second support frame through a first wire hook portion.

3. The lens driving device as described in claim 1, wherein the driving end of one of the at least two shape memory wires that is connected to the fixing bracket is connected to the fixing bracket through a second wire hook portion.

4. The lens driving device as described in claim 1, wherein the driving end of one of the at least two shape memory wires that is connected to the first support frame is connected to the first support frame through a third wire hook portion.

5. The lens driving device as described in claim 1, wherein the at least one first elastic support component comprises two first elastic support components that are respectively disposed at positions of a pair of diagonals of the first support frame along the first direction and are spaced apart from each other, and each of the two first elastic support components has a planar elastic sheet structure perpendicular to the optical axis.

6. The lens driving device as described in claim 5, wherein each of the two first elastic support components comprises a first fixed arm fixed at one corner of the fixing bracket, two second fixed arms respectively fixed on two adjacent ones of the first sidewalls of the first support frame, and two first elastic arms that are suspended and configured to connect the two second fixed arms with the first fixed arm.

7. The lens driving device as described in claim 1, wherein the at least one second elastic support component comprises two second elastic support components that are disposed at positions of another pair of diagonals of the first support frame along the second direction and are spaced apart from each other, and each of the two second elastic support components has a planar elastic sheet structure perpendicular to the optical axis.

8. The lens driving device as described in claim 7, wherein each of the two second elastic support components comprises a third fixed arm fixed at one corner of the first support frame, two fourth fixed arms respectively fixed on two adjacent ones of the second side walls of the second support frame, and two second elastic arms that are suspended and configured to connect the two fourth fixed arms with the third fixed arm.

9. The lens driving device as described in claim 1, further comprising:
a shell covering the second support frame.

* * * * *